United States Patent
Kim et al.

(10) Patent No.: US 11,299,401 B2
(45) Date of Patent: Apr. 12, 2022

(54) POSITIVE ELECTRODE ACTIVE MATERIAL FOR SECONDARY BATTERY, MANUFACTURING METHOD THEREOF, AND SECONDARY BATTERY INCLUDING SAME

(71) Applicant: LG Chem, Ltd., Seoul (KR)

(72) Inventors: Ji Hye Kim, Daejeon (KR); Byung Chun Park, Daejeon (KR); So Ra Baek, Daejeon (KR); Tae Gu Yoo, Daejeon (KR); Wang Mo Jung, Daejeon (KR)

(73) Assignee: LG Energy Solution, Ltd.

( * ) Notice: Subject to any disclaimer, the term of this patent is extended or adjusted under 35 U.S.C. 154(b) by 330 days.

(21) Appl. No.: 16/316,554

(22) PCT Filed: Dec. 19, 2017

(86) PCT No.: PCT/KR2017/015046
§ 371 (c)(1),
(2) Date: Jan. 9, 2019

(87) PCT Pub. No.: WO2018/124593
PCT Pub. Date: Jul. 5, 2018

(65) Prior Publication Data
US 2019/0300382 A1    Oct. 3, 2019

(30) Foreign Application Priority Data

Dec. 28, 2016  (KR) .................. 10-2016-0181022
Dec. 18, 2017  (KR) .................. 10-2017-0174131

(51) Int. Cl.
*H01M 4/131*    (2010.01)
*H01M 4/525*    (2010.01)
(Continued)

(52) U.S. Cl.
CPC ........... *C01G 53/006* (2013.01); *C01G 53/42* (2013.01); *C01G 53/50* (2013.01); *H01M 4/131* (2013.01);
(Continued)

(58) Field of Classification Search
CPC ..... H01M 4/131; H01M 4/1391; H01M 4/525
See application file for complete search history.

(56) References Cited

U.S. PATENT DOCUMENTS

2005/0106463 A1   5/2005   Kikuchi et al.
2006/0171876 A1*  8/2006   Wu ..................... C01G 53/42
                                                       423/594.4
(Continued)

FOREIGN PATENT DOCUMENTS

CN    100359725 C    1/2008
CN    102339997 A    2/2012
(Continued)

OTHER PUBLICATIONS

Extended European Search Report including Written Opinion for Application No. EP17886981.4 dated Jun. 21, 2019.
(Continued)

*Primary Examiner* — Jonathan G Jelsma
(74) *Attorney, Agent, or Firm* — Lerner, David, Littenberg, Krumholz & Mentlik, LLP (57) ABSTRACT

The present invention provides a positive electrode active material for a secondary battery, which includes a lithium transition metal oxide including nickel (Ni) and cobalt (Co), and at least one selected from the group consisting of aluminum (Al), manganese (Mn), and a combination thereof. The lithium transition metal oxide is characterized in that the content of nickel (Ni) in the total transition metal elements is 80 mol % or more, and the cation mixing ratio
(Continued)

of Ni cations in a lithium layer in the lithium transition metal oxide structure is 1.1% or less.

11 Claims, 3 Drawing Sheets

(51) Int. Cl.
*H01M 4/1391* (2010.01)
*C01G 53/00* (2006.01)
*H01M 4/36* (2006.01)
*H01M 4/505* (2010.01)
*H01M 10/0525* (2010.01)
*H01M 4/02* (2006.01)

(52) U.S. Cl.
CPC ......... *H01M 4/1391* (2013.01); *H01M 4/364* (2013.01); *H01M 4/505* (2013.01); *H01M 4/525* (2013.01); *H01M 10/0525* (2013.01); *C01P 2002/60* (2013.01); *C01P 2006/10* (2013.01); *C01P 2006/12* (2013.01); *H01M 2004/028* (2013.01); *H01M 2220/20* (2013.01)

(56) References Cited

U.S. PATENT DOCUMENTS

| | | |
|---|---|---|
| 2008/0032196 A1 | 2/2008 | Park et al. |
| 2009/0011335 A1 | 1/2009 | Takeda et al. |
| 2011/0076556 A1* | 3/2011 | Karthikeyan ...... C01G 45/1257 429/188 |
| 2011/0171529 A1 | 7/2011 | Kono et al. |
| 2011/0200880 A1 | 8/2011 | Yu |
| 2013/0119307 A1 | 5/2013 | Watanabe et al. |
| 2013/0130106 A1 | 5/2013 | Sano et al. |
| 2013/0177816 A1 | 7/2013 | Chang et al. |
| 2013/0247363 A1 | 9/2013 | Nelson et al. |
| 2013/0277604 A1 | 10/2013 | Shimokita et al. |
| 2014/0058598 A1 | 2/2014 | Matsui et al. |
| 2015/0194673 A1 | 7/2015 | Takagi et al. |
| 2015/0380736 A1 | 12/2015 | Park et al. |
| 2016/0118648 A1 | 4/2016 | Gunji et al. |
| 2016/0118656 A1 | 4/2016 | Nakayama et al. |
| 2016/0133927 A1 | 5/2016 | Kamata et al. |
| 2016/0226068 A1 | 8/2016 | Xia et al. |
| 2016/0240846 A1 | 8/2016 | Endo et al. |
| 2016/0260965 A1* | 9/2016 | Wu ..................... H01M 4/0419 |
| 2016/0276665 A1* | 9/2016 | Ide ..................... C01G 45/1242 |
| 2017/0187065 A1 | 6/2017 | Inoue et al. |
| 2017/0288215 A1* | 10/2017 | Mitsumoto ........... H01M 4/366 |
| 2018/0047977 A1 | 2/2018 | Furuichi et al. |
| 2018/0309124 A1* | 10/2018 | Kanada ................. H01M 4/364 |

FOREIGN PATENT DOCUMENTS

| | | |
|---|---|---|
| CN | 103840144 A | 6/2014 |
| CN | 104220381 A | 12/2014 |
| CN | 105594031 A | 5/2016 |
| EP | 1492180 A1 | 12/2004 |
| EP | 3054508 A1 | 8/2016 |
| JP | 2009004285 A | 1/2009 |
| JP | 2011171113 A | 9/2011 |
| JP | 2012022995 A | 2/2012 |
| JP | 2013239434 A | 11/2013 |
| JP | 2014116296 A | 6/2014 |
| JP | 2015225741 A | 12/2015 |
| JP | 2016167439 A | 9/2016 |
| KR | 20110049861 A | 5/2011 |
| KR | 20130081228 A | 7/2013 |
| KR | 20130102718 A | 9/2013 |
| KR | 101326088 B1 | 11/2013 |
| KR | 20160002200 A | 1/2016 |
| KR | 20160010420 A | 1/2016 |
| KR | 20160021112 A | 2/2016 |
| KR | 20160026307 A | 3/2016 |
| KR | 20160046292 A | 4/2016 |
| KR | 20160063982 A | 6/2016 |
| KR | 20160086228 A | 7/2016 |
| WO | 2014077277 A1 | 5/2014 |

OTHER PUBLICATIONS

Search report from International Application No. PCT/KR2017/015046, dated Mar. 3, 2018.

Park, Kang-Joon et al., "A High-capacity Li[Ni08Co0.6Mn0.14]O2 Positive Electrode with a Dual Concentration Gradient for Next-generation Lithium-ion Batteries." Journal of Materials Chemistry A, Sep. 21, 2015, vol. 3, pp. 22183-22190.

* cited by examiner

POSITIVE ELECTRODE ACTIVE MATERIAL FOR SECONDARY BATTERY, MANUFACTURING METHOD THEREOF, AND SECONDARY BATTERY INCLUDING SAME

CROSS-REFERENCE TO RELATED APPLICATIONS

The present application is a national phase entry under § 371 of International Application No. PCT/KR2017/015046 filed Dec. 19, 2017, which claims the benefit of Korean Patent Application Nos. 10-2016-0181022, filed on Dec. 28, 2016, and 10-2017-0174131, filed on Dec. 18, 2017, in the Korean Intellectual Property Office, the disclosures of which are incorporated herein in its entirety by reference.

TECHNICAL FIELD

The present invention relates to a positive electrode active material for a secondary battery, a manufacturing method thereof, and a secondary battery including the same.

BACKGROUND ART

As the technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, lithium transition metal composite oxides have been used. Among these oxides, a lithium cobalt composite metal oxide of $LiCoO_2$ having a high operating voltage and excellent capacity properties has been mainly used. However, since $LiCoO_2$ has very poor thermal properties due to an unstable crystal structure caused by lithium deintercalation, and also is expensive, there is a limitation in using a large amount of $LiCoO_2$ as a power source for applications such as electric vehicles.

As materials for replacing $LiCoO_2$, a lithium manganese composite oxide ($LiMnO_2$ or $LiMn_2O_4$), a lithium iron phosphate compound ($LiFePO_4$, etc.), and a lithium nickel composite oxide ($LiNiO_2$, etc.) have been developed. The research and development of a lithium nickel composite oxide among these materials which has a high reversible capacity of about 200 mAh/g, thereby allowing for a bigger capacity battery to be easily implemented, has been more actively conducted. However, when compared with $LiCoO_2$, $LiNiO_2$ has limitations in that the thermal stability thereof is poor, and when an internal short circuit occurs in a charged state due to pressure from the outside and the like, a positive electrode active material itself is decomposed causing the rupture and ignition of the battery.

Accordingly, as a method for improving the low thermal stability while maintaining the excellent reversible capacity of $LiNiO_2$, a nickel cobalt manganese-based lithium composite metal oxide in which a part of Ni is substituted with Mn and Co (hereinafter, simply referred to as 'NCM-based lithium oxide') was developed. However, conventional NCM-based lithium oxides developed up to the present have no sufficient capacity so that there has been a limitation in the application thereof.

In order to solve such a problem, studies have recently been made to increase the content of Ni in NCM-based lithium oxide. However, in the case of a highly concentrated nickel positive active material having a high nickel content, the structural stability and the chemical stability of the active material are deteriorated so that the thermal stability is rapidly deteriorated. In addition, as the nickel content in the active material increases, the residual amount of lithium by-products present in the form of LiOH and $Li_2CO_3$ on the surface of the positive electrode active material is increased, resulting in the generation of gas and swelling. Problems such as the deterioration of the lifespan and the stability of a battery also occur.

Therefore, there has been a need to develop a highly concentrated Ni-rich positive electrode active material which is in conformity with high capacity, has a small residual amount of lithium by-products, and is excellent in high-temperature stability.

DISCLOSURE OF THE INVENTION

Technical Problem

To solve the above-described limitations, an aspect of the present invention provides a highly concentrated nickel positive electrode active material capable of simultaneously achieving structural stability, excellent capacity properties, and high-temperature stability while having a small residual amount of lithium by-products, a manufacturing method thereof, a positive electrode for a secondary battery including the same, and a lithium secondary battery.

Technical Solution

According to an aspect of the present invention, there is provided a method for preparing a positive electrode active material for a secondary battery including, preparing a lithium transition metal oxide including nickel (Ni) and cobalt (Co), and at least one selected from the group consisting of aluminum (Al), manganese (Mn), and a combination thereof; rinsing the lithium transition metal oxide with water to remove lithium impurities present on the surface of the lithium transition metal oxide; and subjecting the lithium transition metal oxide rinsed with water to a high-temperature heat treatment. The high-temperature heat treatment includes a temperature elevating step for performing the heat treatment while elevating the temperature, a maintaining step for performing the heat treatment while maintaining the elevated temperature, and a cooling step-step for cooling. The temperature elevating step occupies 20 to 30% of the total high-temperature heat treatment time.

According to another aspect of the present invention, there is provided a positive electrode active material for a secondary battery including a lithium transition metal oxide including nickel (Ni) and cobalt (Co), and at least one selected from the group consisting of aluminum (Al), manganese (Mn), and a combination thereof. The lithium transition metal oxide is characterized in that the content of nickel (Ni) in the total transition metal elements is 80 mol % or more, and the cation mixing ratio of Ni cations in a lithium layer in the lithium transition metal oxide structure is 1.1% or less.

According to another aspect of the present invention, there are provided a positive electrode including the above positive electrode active material, and a lithium secondary battery.

Advantageous Effects

According to the present invention, a positive electrode active material having excellent high-temperature stability may be prepared by performing a high-temperature heat treatment under specific conditions after rinsing such that the residual amount of lithium by-products is reduced, and the recrystallization of a destroyed crystal structure in which lithium has escaped occurs, thereby improving the structural stability. In addition, a secondary battery which is structurally stable, has excellent capacity properties even when repeatedly charged, and has a low resistance increase rate may be realized.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention may prepare a positive electrode active material having excellent high-temperature stability by rinsing a lithium transition metal oxide containing highly concentrated nickel with water such that the residual amount of lithium by-products is reduced, and the recrystallization of a destroyed crystal structure in which lithium has escaped occurs, thereby improving the structural stability.

Specifically, the present invention provides a method for preparing a positive electrode active material for a secondary battery including preparing a lithium transition metal oxide including nickel (Ni) and cobalt (Co), and at least one selected from the group consisting of aluminum (Al), manganese (Mn), and a combination thereof; rinsing the lithium transition metal oxide with water to remove lithium impurities present on the surface of the lithium transition metal oxide; and subjecting the lithium transition metal oxide rinsed with water to a high-temperature heat treatment. The high-temperature heat treatment includes a temperature elevating step for performing the heat treatment while elevating the temperature, a maintaining step for performing the heat treatment while maintaining the elevated temperature, and a cooling step for cooling. The temperature elevating step occupies 20 to 30% of the total high-temperature heat treatment time.

First, a lithium transition metal oxide including nickel (Ni) and cobalt (Co), and at least one selected from the group consisting of aluminum (Al), manganese (Mn), and a combination thereof is prepared.

Specifically, the lithium transition metal oxide may be represented by Formula 1 below.

$$Li_aNi_{1-x1-y1-z1}Co_{x1}M^1_{y1}M^2_{z1}M^3_{q1}O_2 \qquad \text{[Formula 1]}$$

In Formula 1, $M^1$ is at least one selected from the group consisting of Mn, Al, and a combination thereof, and $M^2$ and $M^3$ are each independently at least one selected from the group consisting of Ba, Ca, Zr, Ti, Mg, Ta, Nb, W, Mo, and a combination thereof, and $1.0 \le a \le 1.5$, $0 < x1 \le 0.2$, $0 < y1 \le 0.2$, $0 \le z1 \le 0.1$, $0 \le q1 \le 0.1$, and $0 < x1+y1+z1 \le 0.2$.

In the lithium transition metal oxide of Formula 1, Li may be included in an amount corresponding to a, that is, $1.0 \le a \le 0.5$. If a is less than 1.0, the capacity may be decreased. If greater than 1.5, particles may be fired in a firing process, which may make it difficult to prepare a positive electrode active material. Considering the remarkable effect of improving the capacity properties of a positive electrode active material according to the control of Li content and the balance of firing during the manufacturing of the active material, Li may be more preferably included in an amount of $1.0 \le a \le 1.15$.

In addition, in the lithium transition metal oxide of Formula 1, Ni may be included in an amount corresponding to $1-x1-y1-z1$, that is, $0.8 \le 1-x1-y1-z1 < 1$. More preferably, Ni may be included in the range of $0.8 \le 1-x1-y1-z1 < 0.9$. If the content of Ni in the lithium transition metal oxide of Formula 1 is 0.8 or more, an amount of Ni sufficient to contribute to charge/discharge is secured, so that high capacity may be achieved. If the content of Ni is less than 0.8, there may be a limit to the realization of high capacity. In a composition in which the content of Li exceeds 0.9, a portion of the Li site is substituted by Ni, so that an amount of Li sufficient to contribute to charge/discharge may not be secured, thereby deteriorating charge/discharge capacity.

In addition, in the lithium transition metal oxide of Formula 1, Co may be included in an amount corresponding to x1, that is, $0 < x1 \le 0.2$. If the content of Co in the lithium transition metal oxide of Formula 1 is greater than 0.2, the efficiency of improving capacity properties may be reduced compared to an increase in cost. Considering the remarkable effect of improving capacity properties according to the presence of Co, the Co may more specifically be included in an amount of $0.05 \le x \le 0.2$.

In addition, in the lithium transition metal oxide of Formula 1, $M^1$ may be Mn or Al, or may be Mn and Al. Such a metal element may improve the stability of an active material, and as a result, may improve the stability of a battery. Considering the effect of improving lifespan properties, $M^1$ may be included in an amount corresponding to y1, that is, $0 < y1 \le 0.2$. If the content of y1 in the lithium transition metal oxide of Formula 1 exceeds 0.2, the output properties and the capacity properties of a battery may rather be deteriorated. The $M^1$ may more specifically be included in an amount of $0.05 \le y1 \le 0.2$.

In addition, in the lithium transition metal oxide of Formula 1, $M^2$ may be a doping element included in a crystal structure of lithium composite transition metal oxide, and $M^2$ may be included in an amount corresponding to z1, that is, $0 \le z1 \le 0.1$.

In addition, in the lithium transition metal oxide of Formula 1, a metal element of $M^3$ may not be included in the structure of lithium complex transition metal oxide, and if a precursor and a lithium source are mixed and fired, an $M^3$ source may be mixed and fired theretogether, or a lithium composite transition metal oxide may be formed, and then an $M^3$ source may be separately introduced and fired to prepare a lithium composite transition metal oxide in which the $M^3$ is doped on the surface of the lithium complex transition metal oxide. The $M^3$ may be included in an amount corresponding to q1, that is, $1 \leq q1 \leq 0.1$, the content which does not deteriorate the properties of a positive electrode active material.

The lithium transition metal oxide used in the present invention may be an NCM-based lithium composite transition metal oxide including nickel (Ni), cobalt (Co), and manganese (Mn), and may be an NCA-based lithium composite transition metal oxide including nickel (Ni), cobalt (Co), aluminum (Al). In addition, the positive electrode active material may be a four-component lithium composite transition metal oxide necessarily including four components of nickel (Ni), cobalt (Co), manganese (Mn), and aluminum (Al).

In addition, the lithium transition metal oxide used in the present invention may be a high-nickel-based lithium transition metal oxide having a molar ratio of nickel in the total molar ratio of transition metals in the lithium transition metal oxide is 0.8 or more.

The lithium transition metal oxide represented by Formula 1 is not limited thereto, and may be prepared by, for example, mixing a precursor represented by Formula 2 below and a lithium-containing raw material, and firing the mixture at 700 to 900° C. More preferably, firing may be performed in an oxygen atmosphere at the firing temperature.

$$Ni_{1-x2-y2-z2}Co_{x2}M^1_{y2}M^2_{z2}(OH)_2 \qquad \text{[Formula 2]}$$

In Formula 2, $M^1$ is at least one selected from the group consisting of Mn, Al, and a combination thereof, $M^2$ is at least one selected from the group consisting of Ba, Ca, Zr, Ti, Mg, Ta, Nb, W, Mo, and a combination thereof, and $0<x2\leq0.2$, $0\leq y2\leq0.2$, $0\leq z2\leq0.1$, $0<x2+y2+z2\leq0.2$.

In the positive electrode active material precursor of Formula 2, the preferred composition of Ni, Co, $M^1$, and $M^2$ may be the same as the range of the composition of the lithium transition metal oxide described above.

Examples of a lithium-containing raw material may include a lithium-containing carbonate (such as lithium carbonate), a hydrate (such as lithium hydroxide I hydrate ($LiOH \cdot H_2O$)), a hydroxide (such as lithium hydroxide), a nitrate (such as lithium nitrate ($LiNO_3$)) and a chloride (such as lithium chloride (LiCl)) and the like, and any one thereof or a mixture of two or more thereof may be used. More preferably, lithium carbonate may be used.

Next, the lithium transition metal oxide prepared as described above is rinsed with water to remove lithium by-products remaining in the lithium transition metal oxide.

A lithium transition metal oxide containing highly concentrated nickel such as the lithium transition metal oxide of the present invention is structurally unstable as compared with a lithium transition metal oxide having a low content of nickel so that more lithium by-products such as unreacted lithium hydroxide and lithium carbonate are produced in a manufacturing process. Specifically, in the case of a lithium composite metal oxide having a nickel content of less than 80 mol %, the amount of lithium by-products after synthesis is about 0.5 to 0.6 wt %, whereas in the case of a lithium composite metal oxide having a nickel content of 80 mol % or more, the amount of lithium by-products is as high as about 1 wt %. If a large amount of lithium by-products is present in a positive electrode active material, the lithium by-products and an electrolyte are reacted with each other to generate gas and swelling, thereby significantly deteriorating high-temperature stability. Therefore, a rinsing process for removing lithium by-products from a lithium transition metal oxide containing highly concentrated nickel is essentially required.

The rinsing may be performed by, for example, introducing a lithium transition metal oxide into pure water and stirring.

At this time, the rinsing may be performed by using 50 to 100 parts by weight of pure water based on 100 parts by weight of a lithium transition metal oxide.

During the rinsing, if the content of pure water is less than 50 parts by weight based on 100 parts by weight of a lithium transition metal oxide, the removal of lithium by-products may be insufficient due to insufficient cleaning. If the content of pure water exceeds 100 parts by weight, the amount of lithium in the crystal structure dissolved in water may be increased. In particular, in the case of a lithium transition metal oxide containing highly concentrated nickel having a high nickel content of 80 mol % or more, if the content of pure water is too high, the amount of lithium in the crystal structure dissolved in water is significantly increased so that the capacity and the lifespan of a battery may be rapidly reduced.

In addition, the temperature of the rinsing may be 30° C. or less, preferably $-10°$ C. to 30° C., and the time of the rinsing may be 10 minutes to 1 hour. If the rinsing temperature and the rinsing time satisfy the above range, lithium by-products may be effectively removed.

Next, the rinsed lithium transition metal oxide is subjected to a high-temperature heat treatment.

At this time, the high-temperature heat treatment includes a temperature elevating step for performing the heat treatment while elevating the temperature, a maintaining step for performing the heat treatment while maintaining the elevated temperature, and a cooling step for cooling. The temperature elevating step occupies 20 to 30% of the total high-temperature heat treatment time.

The high-temperature heat treatment is performed to additionally remove lithium by-products and to recrystallize metal elements in the positive electrode active material through the high-temperature heat treatment, thereby improving the structural stability and the thermal stability. In the case of the lithium transition metal oxide containing highly concentrated nickel, rinsing is performed to remove residual lithium by-products. However, during the rinsing, not only the lithium by-products, but also lithium in the crystal structure escapes, thereby reducing the crystallinity, and deteriorating the stability. Thus, according to the present invention, the rinsed transition metal oxide is subjected to a high-temperature heat treatment under the above-described conditions to recrystallize the metal elements of the lithium transition metal oxide to fill the vacant spaces of lithium and improve the surface stability.

If the temperature elevating step is less than 20% of the total high-temperature heat treatment time, residual water remaining after the rinsing process is not sufficiently removed so that the deterioration of battery performance such as the deterioration of electric conductivity may occur. If greater than 30%, recrystallization is not effectively performed so that the cation mixing ratio of Ni cations in a lithium layer may be increased.

The maintaining step may be 40 to 50% of the total high-temperature heat treatment time. The cooling step may be 20 to 30% of the total high-temperature heat treatment time. If the ratio of the temperature elevating step, the maintaining step, and the cooling step satisfies the above range, residual water is removed, remaining lithium by-products are additionally removed, and recrystallization is effectively performed, thereby significantly improving the stability.

The total time for the high-temperature heat treatment is preferably within 10 hours, and specifically, the total high-temperature heat treatment time may be 6 hours to 10 hours.

The temperature elevating rate of the temperature elevating step may be 2 to 7° C./min, and more preferably, 3 to 6° C./min. The heat treatment temperature of the maintaining step may be 600° C. or more, and more preferably, 600 to 900° C. The cooling of the cooling step may be performed in a natural cooling manner.

If the time and the heat treatment temperature of each step of the high-temperature heat treatment satisfy the above range, the effect of improving the thermal stability is excellent. According to the studies of the present inventors, if the heat treatment temperature of the maintaining step is less than 600° C., there is little effect of improving the thermal stability.

Meanwhile, the high-temperature heat treatment may be performed in an oxygen atmosphere, specifically, in an atmosphere having an oxygen partial pressure of 80% or more, more preferably 80 to 99%, even more preferably 90 to 95%. When the heat treatment is performed in an oxygen atmosphere as in the present invention, the lithium by-products are effectively removed, and recrystallization may occur effectively. According to the studies of the present inventors, when the heat treatment is performed under the atmosphere, the effect of removing lithium by-products is significantly reduced. In particular, when the heat treatment is performed at a temperature of 600° C. or more under the atmosphere, the amount of lithium by-products are rather increased as compared with that before the heat treatment.

The high-temperature heat treated lithium transition metal oxide may be mixed with at least one selected from the group consisting of $H_3BO_3$, $B_2O_3$, $Al_2O_3$, and a combination thereof, and then subjected to a heat treatment to form a coating layer on the surface of the lithium transition metal oxide. At this time, the heat treatment may be performed at a temperature of 200 to 500° C. By further performing the coating heat treatment, the crystallinity may be improved, and the stability of the positive electrode active material may further be improved.

Next, a positive electrode active material for a secondary battery according to the present invention will be described.

A positive electrode active material for a secondary battery of the present invention prepared by the method described above includes a lithium transition metal oxide including nickel (Ni) and cobalt (Co), and at least one selected from the group consisting of aluminum (Al), manganese (Mn), and a combination thereof. The lithium transition metal oxide is characterized in that the content of nickel (Ni) in the total transition metal elements is 80 mol % or more, and the cation mixing ratio of Ni cations in a lithium layer in the lithium transition metal oxide structure is 1.1% or less.

The lithium transition metal oxide may be represented by Formula 1 below.

$$Li_aNi_{1-x1-y1-z1}Co_{x1}M^1_{y1}M^2_{z1}M^3_{q1}O_2 \quad \text{[Formula 1]}$$

In Formula 1, $M^1$ is at least one selected from the group consisting of Mn, Al, and a combination thereof, and $M^2$ and $M^3$ are each independently at least one selected from the group consisting of Ba, Ca, Zr, Ti, Mg, Ta, Nb, W, Mo, and a combination thereof, and $1.0 \leq a \leq 1.5$, $0 < x1 \leq 0.2$, $0 < y1 \leq 0.2$, $0 \leq z1 \leq 0.1$, $0 \leq q1 \leq 0.1$, and $0 < x1 + y1 + z1 \leq 0.2$. The specific specification of the lithium transition metal oxide represented by the above Formula 1 is the same as that described in the above preparation method, and thus a detailed description thereof will be omitted.

In the case of a typical lithium transition metal oxide containing highly concentrated nickel, when rinsing is performed to remove residual lithium by-products, not only the lithium by-products but also lithium in the crystal structure escapes during the rinsing, thereby reducing the crystallinity and increasing the amount of cation mixing which is incorporated into the lithium layer. This results in the deterioration of electrochemical properties.

Therefore, in order to prepare a positive electrode active material having excellent electrochemical properties such as discharge capacity and lifespan properties, the present invention is characterized in that a lithium transition metal oxide containing highly concentrated nickel is rinsed with water and then subjected to a high-temperature heat treatment in an oxygen atmosphere so that the layered structure of the lithium transition metal oxide is well developed and the amount of the cation mixing of Ni cations in a lithium layer is less than 1.1%. More preferably, the amount of cation mixing may be 1.0% or less. If the amount of cation mixing which is incorporated into the lithium layer satisfies the above range, the capacity properties of the lithium transition metal oxide are excellent, and the high-temperature stability and the lifetime properties may be effectively improved.

In addition, the positive electrode active material according to the present invention is prepared by being subjected to a high-temperature heat treatment in an oxygen atmosphere so that the residual amount of lithium by-products may be significantly reduced. Preferably, the content of lithium by-products resent in the positive electrode active material may be greater than 0.3 wt % to 1 wt % or less, more preferably greater than 0.3 wt % to 0.6 wt % or less, even more preferably greater than 0.35 wt % to 0.5 wt % or less. As such, when the positive electrode active material according to the present invention satisfies the above range of the residual amount of lithium by-products, a coating layer may be effectively formed by the reaction between the lithium by-products and a coating source, thereby effectively suppressing the generation of gas and swelling during charge/discharge. When the residual amount of lithium by-products is 0.3 wt % or less, the amount of lithium by-products to be reacted with the coating source to form the coating layer is insufficient so that it is difficult to form the coating layer and the coating source may act as a resistor. When greater than 1 wt %, due to the excessive amount of lithium by-products, the deterioration of capacity and lifespan and the generation of gas may occur.

In addition, the positive electrode active material according to the present invention may have a crystal density of 4.76 g/cm³ or greater, more preferably 4.765 g/cm³ or greater. In the case of a typical positive electrode active material containing highly concentrated nickel, the crystal density thereof is significantly reduced while being rinsed with water so that the structure stability and the high-temperature stability are deteriorated. However, a positive electrode active material according to the present invention is subjected to a high-temperature heat treatment in an oxygen atmosphere after being rinsed with water causing the recrystallization of metal elements so that the crystal density may be increased to 4.76 g/cm$^3$ or greater. As a result, the amount of heat generated is significantly reduced, and the high-temperature lifespan properties and the high-temperature resistance increase rate may be significantly improved.

In addition, a positive electrode active material according to the present invention may have a BET specific surface area of 0.5 m$^2$/g or less. In the case of a typical positive electrode active material containing highly concentrated nickel, lithium in the surface crystal structure escapes while being rinsed with water causing the significant increase in specific surface area so that the structural stability and the high-temperature stability are deteriorated. However, a positive electrode active material according to the present invention is subjected to a high-temperature heat treatment in an oxygen atmosphere after being rinsed with water causing the recrystallization of metal elements so that the specific surface area may be reduced to 0.5 m$^2$/g or less, more preferably 0.35 m$^2$/g or less. As a result, the amount of heat generated is significantly reduced, and the high-temperature lifespan properties and the high-temperature resistance increase rate may be significantly improved.

In addition, when the heat flow is measured by differential scanning calorimetry (DSC), the positive electrode active material according to the present invention has the maximum peak in a temperature range of 220 to 250° C., preferably 225 to 245° C., and the maximum value of the heat flow may be less than 200 mW (based on 15 mg sample). When the high temperature heat treatment is not performed after rinsing with water, or if the heat treatment temperature and the atmosphere do not satisfy the conditions of the present invention even when the heat treatment is performed, the maximum peak appears at a lower temperature, that is less than 220° C., and a high heat flow value exceeding 200 mW (based on 15 mg sample) appears. As such, when a positive electrode active material having the maximum peak in a lower temperature range as described above and having a high heat flow maximum value is used, when the temperature inside a battery is increased due to overcharging and the like, the heat flow is rapidly increased thereby causing explosion. In contrast, the positive electrode active material of the present invention has a relatively high temperature range in which the maximum peak appears, and has a lower heat flow maximum value, and thus even when the temperature inside a battery is increased due to overcharging and the like, there is a low possibility of explosion.

In addition, in the positive electrode active material according to the present invention, the lithium transition metal oxide may include a layered structural phase and a spinel-like structural phase. The spinel-like structural phase may be formed by a phase transition from a layered structural phase. The phase transition may be caused by a high temperature heat treatment.

According to another embodiment of the present invention, there is provided a positive electrode including the positive electrode active material described above.

Specifically, the positive electrode includes a positive electrode current collector, and a positive electrode active material layer disposed on at least one surface of the positive electrode current collector and including the positive electrode active material described above.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 µm to 500 µm, and microscopic irregularities may be prepared on the surface of the positive electrode current collector to improve the adhesion of the positive electrode active material. The positive electrode current collector may be used in various forms of such as a film, a sheet, a foil, a net, a porous body, a foam, and a non-woven body.

The positive electrode active material layer may include a conductive material and a binder in addition to the positive electrode active material described above.

At this time, the positive electrode active material may be included in an amount of 80 to 99 wt %, more specifically 85 to 98 wt % based on the total weight of the positive electrode active material layer. When included in the above content range, excellent capacity properties may be exhibited.

At this time, the conductive material is used to impart conductivity to the electrode, and any conductive material may be used without particular limitation as long as it has electron conductivity without causing a chemical change in the battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on a total weight of the positive electrode active material layer.

The binder serves to improve the bonding among positive electrode active material particles and the adhesion between the positive electrode active material and the current collector. Specific examples thereof may include polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be manufactured according to a typical method for manufacturing a positive electrode except that the positive electrode active material described above is used. Specifically, the positive electrode may be manufactured by preparing a composition for forming a positive electrode active material layer prepared by dissolving or dispersing the positive electrode active material described above and selectively, a binder and a conductive material in a solvent, applying the composition on the positive electrode current collector, and then drying and rolling the applied positive electrode current collector. At this time, the type and the amount of the positive electrode active material, the binder, and the conductive material are the same as those previously described.

The solvent may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive material, and the binder in consideration of an applying thickness of a slurry and manufacturing yield, and may allow to have a viscosity capable of exhibiting excellent thickness uniformity during the subsequent applying for the preparation of the positive electrode.

Also, as another method, the positive electrode may be manufactured by casting the composition for forming a positive electrode active material layer on a separate support and then laminating a film separated from the support on the positive electrode current collector.

According to another embodiment of the present invention, there is provided an electrochemical device including the positive electrode. The electrochemical device may specifically be a battery or a capacitor, more specifically, a lithium secondary battery.

The lithium secondary battery specifically includes a negative electrode disposed to face the positive electrode, a separator disposed between the positive electrode and the negative electrode, and an electrolyte. The positive electrode is as described above. Also, the lithium secondary battery may further selectively include a battery case accommodating an electrode assembly of the positive electrode, the negative electrode, and the separator, and a sealing member for sealing the battery case.

In the lithium secondary battery, the negative electrode includes a negative electrode current collector and a negative electrode active material layer disposed on the negative electrode current collector.

The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, and an aluminum-cadmium alloy may be used. Also, the negative electrode collector may typically have a thickness of 3 µm to 500 µm, and as in the case of the positive electrode current collector, microscopic irregularities may be prepared on the surface of the negative electrode current collector to improve the adhesion of a negative electrode active material. The negative electrode current collector may be used in various forms of such as a film, a sheet, a foil, a net, a porous body, a foam body, and a non-woven fabric body.

The negative electrode active material layer selectively includes a binder and a conductive agent in addition to the negative electrode active material.

As the negative electrode active material, a compound capable of reversibly intercalating and deintercalating lithium may be used. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x(0<x<2)$, $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive material may be the same as those previously described in the description of the positive electrode.

The negative electrode active material layer may be prepared by, for example, applying a composition for forming a negative electrode active material layer, which selectively includes the binder and the conductive agent as well as the negative electrode active material, on the negative electrode current collector and drying the applied negative electrode current collector, or may be prepared by casting the composition for forming a negative electrode active material layer on a separate support and then laminating a film separated from the support on the negative electrode current collector.

In the lithium secondary battery, a separator separates the negative electrode and the positive electrode, and provides a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of high melting point glass fibers or polyethylene terephthalate fibers may be used. Furthermore, a coated separator including a ceramic component or a polymer material may be used to secure heat resistance or mechanical strength, and may be selectively used as a single layer or a multilayered structure.

Also, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of a lithium secondary battery, but is not limited thereto.

Specifically, the electrolyte may include an organic solvent and a lithium salt.

Any organic solvent may be used as the organic solvent without particular limitation as long as it may serve as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable. In this case, when a cyclic carbonate and a chain carbonate are mixed in a volume ratio of about 1:1 to about 1:9, the performance of the electrolyte may be excellent.

Any compound may be used as the lithium salt without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. When the concentration of the lithium salt is included within the above range, the electrolyte has suitable conductivity and viscosity so that the electrolyte may show excellent performance, and lithium ions may effectively move.

In order to improve the lifespan properties of the battery, suppress the reduction in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in the electrolyte in addition to the above electrolyte components. In this case, the additive may be included in an amount of 0.1 wt % to 5 wt % based on the total weight of the electrolyte.

As described above, the lithium secondary battery including the positive electrode active material according to the present invention stably exhibits excellent discharge capacity, output properties, and capacity retention, thereby being useful for portable devices such as a mobile phone, a notebook computer, and a digital camera, and for electric cars such as a hybrid electric vehicle (HEV).

Thus, according to another embodiment of the present invention, a battery module including the lithium secondary battery as a unit cell, and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

The external shape of the lithium secondary battery of the present invention is not particularly limited, but may be a cylindrical shape using a can, a square shape, a pouch shape, a coin shape, and the like.

The lithium secondary battery according to the present invention may be used not only in a battery cell used as a power source of a small device but also as a unit cell in a medium/large-sized battery module including a plurality of battery cells.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

300 g of lithium transition metal oxide (Li($Ni_{0.86}Co_{0.1}Mn_{0.02}Al_{0.02}$)$O_2$) was added to 240 mL of pure water, stirred for 30 minutes, rinsed with water, and filtered for 20 minutes. The filtered lithium transition metal oxide was dried in a vacuum oven at 130° C. and then subjected to sieving.

Thereafter, the rinsed lithium transition metal oxide was subjected to a high-temperature heat treatment in an oxygen atmosphere having an oxygen partial pressure of 95%. At this time, the high-temperature heat treatment was performed by elevating the temperature to 700° C. at a rate of 5° C./min for 2 hours and 15 minutes, performing heat treatment at 700° C. for 3 hours and 40 minutes, and then performing cooling for 2 hours and 30 minutes.

Next, $H_3BO_3$ in an amount of 1.0 wt % based on the B content is mixed with the high-temperature heat-treated lithium transition metal oxide, and the mixture is subjected to a coating heat treatment at 300° C. for 5 hours in a dry air atmosphere to prepare a positive electrode active material.

Example 2

A positive electrode active material was prepared in the same manner as in Example 1 except that during the high-temperature heat treatment, the temperature was elevated to 600° C. at a rate of 4° C./min for 2 hours and 20 minutes, heat treatment was performed at 600° C. for 3 hours and 40 minutes, and cooling was performed for 2 hours and 30 minutes.

Comparative Example 1

A positive electrode active material was prepared in the same manner as in Example 1 except that the high-temperature heat treatment was not performed.

Comparative Example 2

A positive electrode active material was prepared in the same manner as in Example 1 except that during the high-temperature heat treatment, the temperature was elevated to 200° C. for 45 minutes, heat treatment was performed at 200° C. for 10 hours, and cooling was performed for 60 minutes.

Comparative Example 3

A positive electrode active material was prepared in the same manner as in Example 1 except that during the high-temperature heat treatment, the temperature was elevated to 300° C. for 70 minutes, heat treatment was performed at 300° C. for 3 hours and 40 minutes, and cooling was performed for 90 minutes.

Comparative Example 4

A positive electrode active material was prepared in the same manner as in Example 1 except that during the high-temperature heat treatment, the temperature was elevated to 400° C. for 80 minutes, heat treatment was performed at 400° C. for 4 hours, and cooling was performed for 2 hours.

Comparative Example 5

A positive electrode active material was prepared in the same manner as in Example 1 except that during the high-temperature heat treatment, the temperature was elevated to 500° C. for 90 minutes, heat treatment was performed at 500° C. for 4 hours, and cooling was performed for 2 hours and 20 minutes.

Comparative Example 6

A positive electrode active material was prepared in the same manner as in Example 1 except that during the high-temperature heat treatment, the temperature was elevated to 700° C. for 3 hours, heat treatment was performed at 700° C. for 10 hours, and cooling was performed for 3 hours.

Comparative Example 7

A positive electrode active material was prepared in the same manner as in Example 1 except that during the high-temperature heat treatment, heat treatment was performed under the atmosphere instead of in an oxygen atmosphere.

Experimental Example 1: XRD Analysis by Process

The positive electrode active materials prepared in Example 1 and Comparative Example 1 were subjected to XRD analysis using Bruker AXS D4 Endeavor XRD, and the crystallite, the crystal density, the cation mixing of Ni cations in the lithium layer according to the analysis are shown in Table 1. In addition, the BET surface area was measured using BELSORP-mini, and the results are shown in Table 1.

TABLE 1

| | Process | Cation mixing (%) | Crystal density (g/cm$^3$) | Crystallite (nm) | BET surface area (m$^2$/g) |
|---|---|---|---|---|---|
| Example 1 | Before rinsing | 1.0 | 4.773 | 181 | 0.27 |
| | Rinsing | 1.4 | 4.757 | 182 | 1.51 |
| | High-temperature heat treatment | 1.1 | 4.768 | 173 | 0.33 |
| | Coating heat-treatment | 1.0 | 4.768 | 154 | 0.32 |
| Comparative Example 1 | Rinsing-Coating heat treatment | 1.4 | 4.722 | 159 | 0.68 |

Referring to Table 1 above, in the case of Example 1 in which the high-temperature heat treatment was performed according to the present invention, the amount of cation mixing was reduced, the crystal density was increased, and the BET specific surface area was reduced as compared with Comparative Example 1 in which the high-temperature heat treatment was not performed.

Experimental Example 2: Evaluation of Residual Amount of Lithium by-Products 10 g of the positive electrode active material prepared in Examples and Comparative Examples was dispersed in 100 mL of water and titrated with 0.1 M of HCl to measure the change in pH value to obtain a pH titration curve. The LiOH residual amount and the Li$_2$CO$_3$ residual amount in each positive electrode active material were calculated using the pH titration curve, and the sum of the LiOH residual amount and the Li$_2$CO$_3$ residual amount was evaluated as the total residual amount of the lithium by-products. The results are shown in Table 2 below.

TABLE 2

| | LiOH residual amount (wt %) | Li$_2$CO$_3$ residual amount (wt %) | Total residual amount of lithium by-products (wt %) |
|---|---|---|---|
| Example 1 | 0.234 | 0.070 | 0.304 |
| Example 2 | 0.278 | 0.171 | 0.449 |
| Comparative Example 1 | 0.356 | 0.200 | 0.556 |
| Comparative Example 2 | 0.211 | 0.334 | 0.545 |
| Comparative Example 3 | 0.246 | 0.272 | 0.518 |
| Comparative Example 4 | 0.328 | 0.305 | 0.633 |
| Comparative Example 5 | 0.360 | 0.236 | 0.596 |
| Comparative Example 6 | 0.305 | 0.214 | 0.519 |
| Comparative Example 7 | 0.779 | 0.605 | 1.384 |

Referring to Table 2 above, as compared with Comparative Example 1 in which the high-temperature heat treatment was not performed, and Comparative Examples 2 to 6 in which the conditions of the high-temperature heat treatment according to the present invention were not satisfied, in Examples 1 to 2, the amount of residual lithium by-products were significantly reduced. In the case of Comparative Example 7 in which the heat treatment was performed under the atmosphere, the amount of residual lithium by-products was further increased as compared with Comparative Example 1 in which the high-temperature heat treatment was not performed.

Experimental Example 3: Evaluation of Heat Flow

The heat flow according to the temperature of the positive electrode active materials of Examples and Comparative Examples was measured using a differential scanning calorimeter (SENSYS Evo of SETARAM Co.). 15 mg of an electrode charged with 4.25 V was sampled and added with 20 μl of an electrolyte, and the measurement was performed up to 400° C. while elevating the temperature at a temperature elevating rate of 10° C./min.

Figure 1:
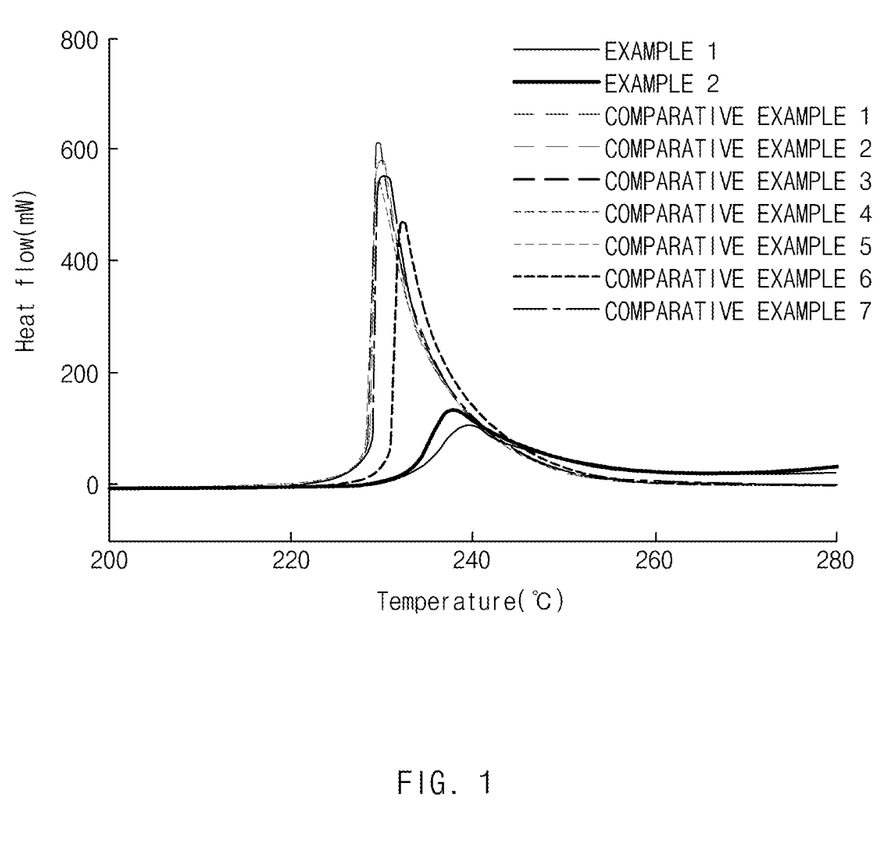
FIG. 1 is a graph showing the heat flow for the temperature of positive electrode active materials according to examples and comparative examples.

The measurement results are shown in FIG. 1.

Referring to FIG. 1, in the cases of the positive electrode active materials of Examples 1 and 2, the maximum value of the heat flow is less than 200 mW, while in the cases of the positive electrode active materials of Comparative Examples 1 to 7, the maximum value of the heat flow exceeds 400 mW. Particularly, in the case of Comparative Example 1, the maximum value of the heat flow exceeds 600 mW. The results show that the positive electrode active materials of Examples 1 and 2 have excellent high-temperature stability as compared with the positive electrode active materials of Comparative Examples 1 to 7.

Experimental Example 4: Evaluation of Battery Performance

The positive electrode active materials respectively prepared in Examples and Comparative Examples, carbon black as a conductive material, and PVdF as a binder were mixed in N-methylpyrrolidone, which is a solvent, in a weight ratio of 95:2.5:2.5 to prepare a composition for forming a positive electrode (viscosity: 5,000 mPa·s), and an aluminum current collector was applied with the composition, dried at 130° C., and rolled to manufacture a positive electrode.

Also, natural graphite as a negative electrode active material, carbon black as a conductive material, and PVdF as a binder were mixed in N-methylpyrrolidone, which is a solvent, in a weight ratio of 85:10:5 to prepare a composition for preparing a negative electrode, and the composition was applied on one surface of a copper current collector to prepare a negative electrode.

Each lithium secondary battery was manufactured by preparing an electrode assembly by disposing a porous polyethylene separator between the positive electrode and the negative electrode prepared as described above, disposing the electrode assembly in a case, and then injecting an electrolyte into the case. At this time, the electrolyte was prepared by dissolving lithium hexafluorophosphate (LiPF$_6$) of 1.0 M concentration in an organic solvent of ethylene carbonate/dimethyl carbonate/ethylmethyl carbonate (mixing volume ratio of EC/DMC/EMC=3/4/3).

Figure 2:
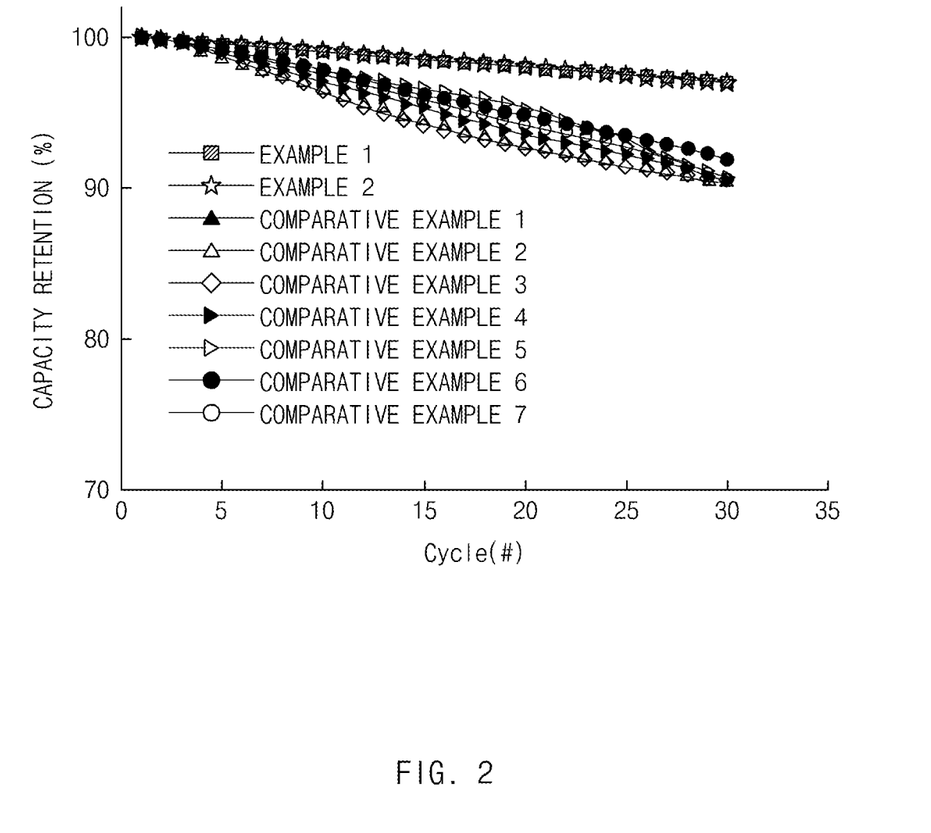
FIG. 2 is a graph showing the capacity retention for the charge/discharge cycle of battery cells manufactured by using positive electrode active materials according to examples and comparative examples.
Figure 3:
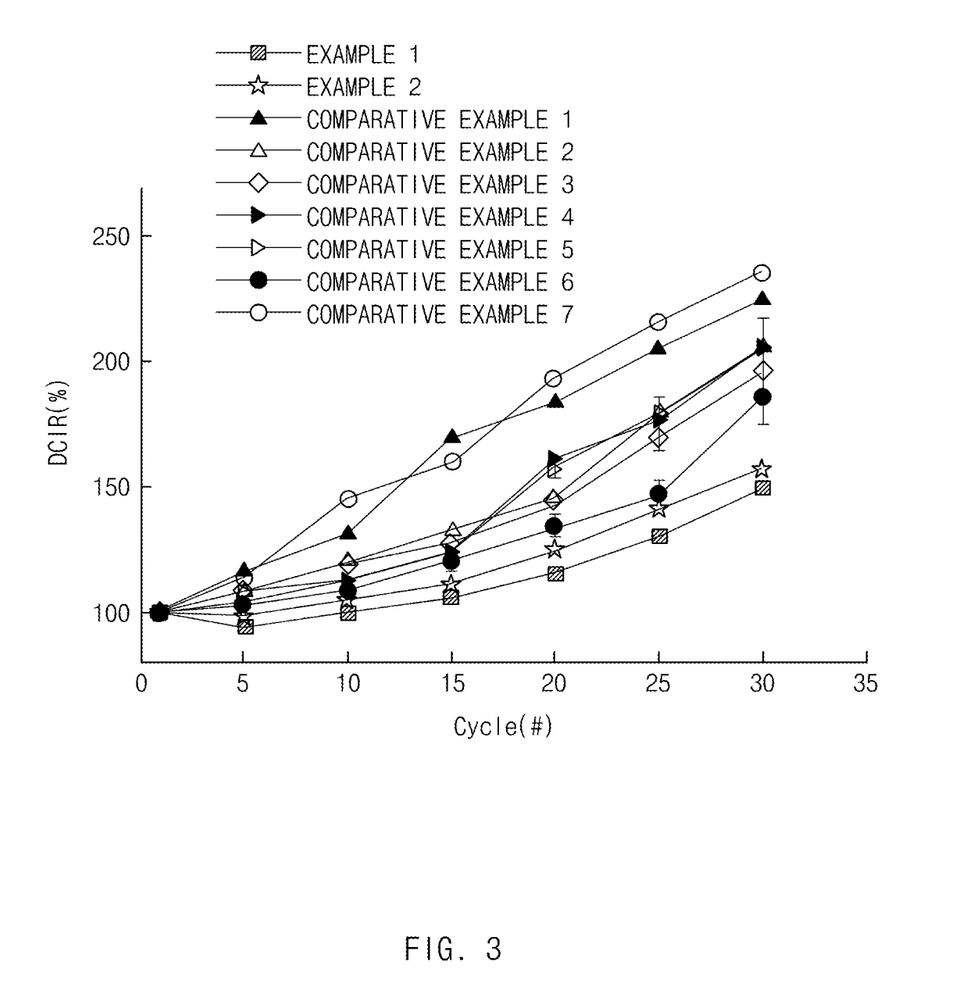
FIG. 3 is a graph showing the resistance increase rate for the charge/discharge cycle of battery cells manufactured by using positive electrode active materials according to examples and comparative examples.

The lithium secondary battery manufactured as described above was charged and discharged at 45° C. for 30 cycles under the conditions of a charge end voltage of 4.25 V, a discharge end voltage of 2.5 V, and 0.3 C/0.3 C to measure the capacity retention ([%]) and the resistance increase rate (DCIR [%]). The measurement results are shown in FIGS. 2 and 3. FIG. 2 is a graph showing the capacity retention, and FIG. 3 is a graph showing the resistance increase rate.

Referring to FIGS. 2 and 3, that in the case of the secondary battery in which the positive electrode active materials of Examples 1 and 2 were applied, the capacity retention and the resistance increase rate were significantly reduced at 30 charge/discharge cycles as compared with the secondary battery in which the positive electrode active materials of Comparative Examples 1 to 7 were applied. Thus, it can be confirmed that the high-temperature lifespan properties and the resistance properties were improved.

The invention claimed is:

1. A method for preparing a positive electrode active material for a secondary battery, comprising:
   preparing a lithium transition metal oxide including nickel (Ni) and cobalt (Co), and at least one selected from the group consisting of aluminum (Al), manganese (Mn), and a combination thereof;
   rinsing the lithium transition metal oxide with water to remove lithium impurities present on a surface of the lithium transition metal oxide; and
   subjecting the lithium transition metal oxide rinsed with water to a high-temperature heat treatment to form a high-temperature heat treated lithium transition metal oxide, wherein
   the high-temperature heat treatment includes:
   elevating a temperature to an elevated temperature;
   maintaining the elevated temperature; and
   cooling,
   wherein an amount of time spent in the elevating the temperature step is 20 to 30% of a total time of the high-temperature heat treatment,
   wherein an amount of time spent in the maintaining step is 40 to 50% of the total time of the high-temperature heat treatment, and
   wherein an amount of time spent in the cooling step is 20 to 30% of the total time of the high-temperature heat treatment.

2. The method of claim 1, wherein the total time of the high-temperature heat treatment is 6 to 10 hours.

3. The method of claim 1, wherein, in the maintaining the elevated temperature step, the elevated temperature step is 600° C. to 900° C.

4. The method of claim 1, wherein, in the elevating the temperature step, the temperature is elevated at a rate of step 2 to 7° C./min.

5. The method of claim 1, wherein the cooling step is natural cooling.

6. The method of claim 1, wherein the high-temperature heat treatment is performed in an oxygen atmosphere having an oxygen partial pressure of 80% or more.

7. The method of claim 1, wherein the rinsing is performed using 50 to 100 parts by weight of pure water based on 100 parts by weight of the lithium transition metal oxide.

8. The method of claim 1, wherein the rinsing is performed at a temperature of −10 to 30° C.

9. The method of claim 1, wherein the lithium transition metal oxide is represented by Formula 1 below:

$$Li_aNi_{1-x1-y1-z1}Co_{x1}M^1_{y1}M^2_{z1}M^3_{q1}O_2 \quad [\text{Formula 1}]$$

(in Formula 1, $M^1$ is at least one selected from the group consisting of Mn, Al, and a combination thereof, and $M^2$ and $M^3$ are each independently at least one selected from the group consisting of Ba, Ca, Zr, Ti, Mg, Ta, Nb, W, Mo, and a combination thereof, and 1.0≤a≤1.5, 0<x1≤0.2, 0<y1≤0.2, 0≤z1≤0.1, 0<q1≤0.1, and 0<x1+y1+z1≤0.2).

10. The method of claim 1, wherein the preparing a lithium transition metal oxide is performed by mixing a precursor represented by Formula 2 below and a lithium-containing raw material, and firing the mixture at 700 to 900° C.:

$$Ni_{1-x2-y2-z2}Co_{x2}M^1_{y2}M^2_{z2}(OH)_2 \quad [\text{Formula 2}]$$

(in Formula 2, $M^1$ is at least one selected from the group consisting of Mn, Al, and a combination thereof, $M^2$ is at least one selected from the group consisting of Ba, Ca, Zr, Ti, Mg, Ta, Nb, W, Mo, and a combination thereof, and 0<x2≤0.2, 0<y2≤0.2, 0≤z2≤0.1, 0≤q2≤0.1, 0<x2+y2+z2≤0.2).

11. The method of claim 1, wherein the method further comprises:
   mixing the high-temperature heat-treated lithium transition metal oxide with at least one selected from the group consisting of $H_3BO_3$, $B_2O_3$, $Al_2O_3$, and a combination thereof to form a mixture, and heat treating the mixture at a temperature of 200 to 500° C. to form a coating layer on the surface of the lithium transition metal oxide.

* * * * *